United States Patent [19]
Wong

[11] 3,802,193

[45] Apr. 9, 1974

[54] BARRIER RING INJECTOR
[75] Inventor: Kin Y. Wong, Sacramento, Calif.
[73] Assignee: The United States of America as represented by the Secretary of the United States Air Force, Washington, D.C.
[22] Filed: Nov. 29, 1972
[21] Appl. No.: 310,613

[52] U.S. Cl............ 60/258, 60/39.74 A, 239/424.5, 239/549
[51] Int. Cl........................... F02k 9/02, B05b 7/08
[58] Field of Search........ 60/39.74 A, 258, 39.74 R; 239/424, 424.5, 549

[56] References Cited
UNITED STATES PATENTS
3,488,951   1/1970   Chamberlain et al. ......... 239/424 X
2,719,584   10/1955   Winslow ........................ 60/39.74 A
3,665,710   5/1972   Ficon et al............................ 60/258
2,810,259   10/1957   Burdett.......................... 60/39.74 A
2,551,114   5/1951   Goddard......................... 60/39.74 A Primary Examiner—Carlton R. Croyle
Assistant Examiner—Robert E. Garrett

[57] ABSTRACT

A rocket engine injector device including three flanged concentric annular members and a manifold ring assembled to provide the high injection density required for barrier cooling. The barrier ring assembly includes an inner oxidizer metering ring serving as an oxidizer feed and a second ring for feeding oxidizer and metering fuel positioned around the inner ring. A third ring is fitted over the second ring for feeding fuel thereto. A fourth ring positioned around the third ring serves as a propellant manifold for barrier cooling the injector assembly.

5 Claims, 1 Drawing Figure

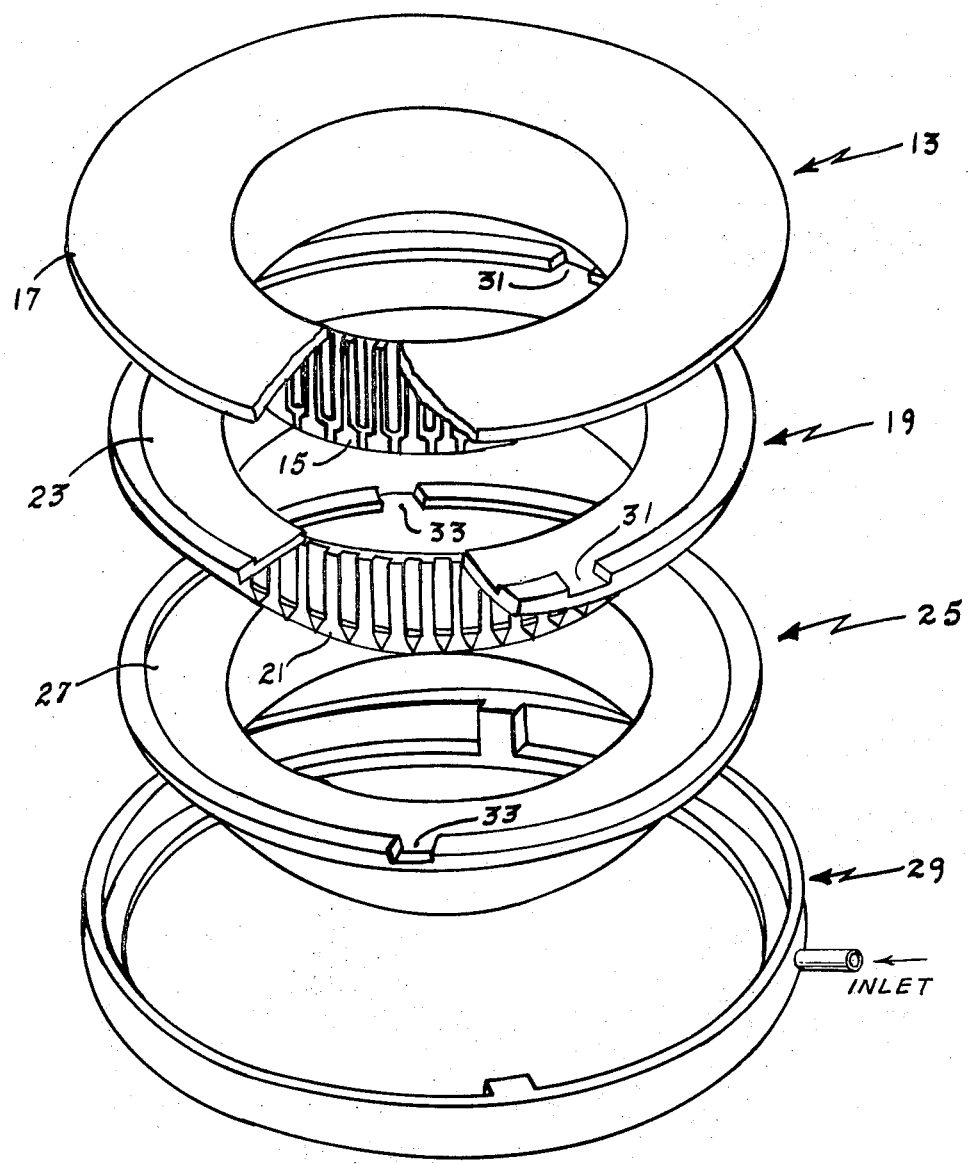

BARRIER RING INJECTOR

BACKGROUND OF THE INVENTION

This invention relates to an improved injector device suitable for use with a liquid fuel rocket and, more particularly, the invention is concerned with providing a barrier ring injector having three flanged concentric rings and a manifold ring assembled in a manner to provide barrier cooling as well as versatility of adjusting the pattern for any required local mass and mixture ratio.

In rocket engine injectors for introducing fuel and oxidant fluids into combustion chambers, the injectors have generally been classified as to the type of method of mixing or atomizing the fluids, and designated as impingement, spray, splash, premixing or showerhead pattern types. The impingement type of injectors consist of a number of separate holes arranged in such a manner that the resulting propellant streams of the fuel and oxidant intersect each other whereby a full stream of the fuel will impinge the oxidizer stream and break up into small droplets. In the spray or splash types of injectors, the injectors provide conical, cylindrical or other type of spray sheets of propellant fluids which intersect each other and thereby atomize and mix. The premixing or non-impinging injector is one wherein the fuel and the oxidizer do not impinge but mix largely by diffusion of the propellant vapors and turbulence, that is, fine particles of fuel mix with oxidizer.

These prior methods of propellant mixing and atomization have certain inherent disadvantages. In the impingement type of injectors, for example, the droplet size is of considerable significance in that there is not always assurance of atomization and it is possible that the stream of oxidant will remain uncombined with the fuel or be misdirected against the combustion chamber wall. The spray, splash, and premixing type of injectors are not capable of providing the fine atomization and intimate mixing which is required in order to insure proper combustion at various flow rates of the oxidant and fuel into the combustion chamber for various rocket thrust levels.

Injectors known in the prior art have certain other disadvantages. Less efficient mixing capability and higher injector velocity require lengthened thrust or combustion chamber length, hence reducing rocket performance because of the resulting weight. Cooling problems relating to the injector and thrust chamber have required complex or costly solutions, further detracting from a foal of economical but high performance. Rocket engine throttling means have been complicated, and combustion stability difficult to achieve.

SUMMARY OF THE INVENTION

The present invention is concerned with providing a new and improved fluid distribution and injection system which overcomes the above and other disadvantages of the prior art. The barrier ring injector according to the invention includes three flanged, concentric rings and a manifold ring. The inner ring has an oxidizer metering pattern depth-etched on its external surface. A second flanged ring having a fuel metering pattern depth-etched on its external ring surface is fitted over the inner ring. A third ring having the fuel manifold machined into its flanged surface is fitted around the second ring and feeds the fuel metering channels therein. A fourth manifold ring fitted around the outside diameter of the flanged rings and serves to complete the barrier coolant ring assembly.

Accordingly, it is an object of the invention to provide a barrier coolant ring which is sufficiently compact to achieve the high injection density required for barrier cooling.

Another object of the invention is to provide a new and improved injection system wherein the mixture ratio and local mass can be adjusted to any pattern to offset nonuniformities in the core injector or local disturbances created by baffles in the rocket engine.

Still another object of the invention is to provide an improved barrier ring injector capable of producing a low mixture ratio barrier.

A further object of the invention is to provide a new and improved propellant injection system capable of high-mixing efficiency at relatively low injection pressures to improve throttle control characteristics by permitting a wide range of different propellant flow rates.

Another further object of the invention is to provide a new and improved barrier ring injector for propulsive devices wherein the thermal characteristics of the device are vastly improved. Cooling is achieved without sacrificing injection densities in the barrier zone.

A still further object of the invention is to provide a barrier ring injector having the required flow rates, mass distribution and mixture ratio control at the injector periphery (barrier zone). The hereinafter described design provides the required barrier zone design for injector/chamber compatability.

These and other objects, features, and advantages will become more apparent after considering the following description taken in conjunction with the annexed drawing and appended claims.

DESCRIPTION OF THE DRAWING

The drawing is an exploded view in perspective of a barrier ring injector according to the invention showing the structural arrangement of the several annular members.

DESCRIPTION OF A PREFERRED EMBODIMENT

Referring now to the drawing, there is shown a view of the four annular members which comprise the barrier ring injector. The first ring 13 which is positioned innermost in the injector, has an oxidizer metering pattern depth-etched on its external surface 15 and includes a flange portion 17 extending outwardly from the upper edge of the surface 15. A second flanged ring 19 is fitted over the first ring 13. The second ring 19 has a fuel metering pattern depth-etched on its external surface 21. In addition, an oxidizer manifold pattern is machined on its flanged surface 23. The oxidizer manifold feeds the inner ring oxidizer metering pattern 15.

A third flanged ring 25 fits over the second ring 19. The third ring 25 has a fuel manifold machined in the flanged surface 27 which, in turn, feeds the fuel metering channels 21 in the second ring 19. A four manifold ring 29 is fitted over the outside diameter of the flanged rings 13, 19, and 25 to complete the basic required components for the barrier coolant ring assembly. The total width of the ring is typically less than one-eighth inch.

The injector is best assembled by shrink fitting the components together and electron-beam welding on the periphery of the flanges. After assembly the coolant ring is ready for installation on the injector body (not shown) for which it was designed. The herein described coolant ring provides the high injection density required for barrier cooling. In addition, it provides the versatility of adjusting the pattern to produce any required local mass and mixture ratio to offset non-uniformities in the core injector or local disturbances created by baffles.

It will be apparent that each of the rings 13 and 19 distributes only one type of fluid since only one fluid manifold is in fluid communication with the metering pattern on the corresponding ring. Since the adjacent rings 13 and 19 each provide a different fluid, the finely atomized sprays mix very efficiently and, in the case of hypergolic fluids, produce combustion on contact. That is, the oxidizer from the pattern 15 mixes with the fuel from the pattern 21. The openings 31 in the rim of the flange 23 allow the oxidizer to reach the pattern 15 while the openings 33 in the rim of the flange 27 allow the fuel to reach the pattern 21. Pipe connections in the manifold ring 29 feed the oxidizer and fuel to the proper rings in the injector assembly.

The aforedescribed barrier ring injector is capable of injecting propellants into a combustion chamber at the same and higher rates than the previously known stacked photoetched platelet concept. High mixing and combustion efficiencies can be obtained at relatively low discharge pressures permitting a relatively wide range of throttle control over the output thrust of the rocket engine in which the injector is used.

Additionally, in previously known platelet assemblies, barrier cooling for maintaining thrust chamber/injector compatibility had to be obtained by blocking oxidizer flow from specific orifices in the periphery of the injector.

This arrangement was generally unsatisfactory because of the inability to achieve injection densities in the cooling barrier zone equivalent to that of the platelet core. The injector of the present invention provides the high injection density and mass and mixture ratio control of the more conventional platelet assemblies while at the same time achieving the barrier cooling for maintaining thrust chamber/injector compatibility. Also, the injector periphery or barrier zone is provided with the required flow rates, mass distribution and mixture ratio control for more efficient operation of the rocket engine and more uniform heat distribution across the injector.

Although the invention has been illustrated in the accompanying drawing and described in the foregoing specification in terms of a preferred embodiment thereof, the invention is not limited to this embodiment or to the preferred configuration mentioned. It will be apparent to those skilled in the art that my invention could have extensive use in other operations where it is desirable to atomize and intimately mix different fluids during a chemical process. Also, it should be noted that although this invention has been illustrated in terms of a bi-propellant system, it is not necessarily so limited and is equally applicable with monopropellant, tri-propellant, hybrid and other systems.

Also, it should be understood that various changes, alterations, modifications, and substitutions particularly with respect to the construction details can be made in the arrangement of the several elements without departing from the true spirit and scope of the appended claims.

Having thus described my invention, what I claim and desire to secure by Letters Patent of the United States is:

1. A barrier ring injector for supplying propellant to a rocket engine having a combustion chamber said injector comprising a first annular member having an outwardly extending flange attached to the upper edge thereof, means on the outer surface of said first annular member for metering the flow of propellant thereover, a second annular member positioned in close contact around said first annular member, a flange extending outwardly from the upper edge of said second annular member for feeding propellant to the outer surface of said first annular ring, means on the outer surface of said second annular member for metering the flow of propellant thereover, the propellant flowing over the surface of said first and second annular members being mixed upon exit therefrom, a third annular member positioned in close contact around said second annular member, said third annular member having a flange extending outwardly from the upper edge thereof for feeding propellant to the outer surface of said second annular member, and a fourth annular member positioned around the outer edges of the flanges on said first, second and third annular members, said fourth annular member having means attached thereto for feeding propellant to said annular members.

2. The propellant injector defined in claim 1 wherein the means on the outer surface of said first annular member for metering the flow of propellant thereover includes a deep-etched pattern of flow passages terminating at the lower edge of said first annular member.

3. The propellant injector defined in claim 2 wherein the propellant flowing through the passages in said first annular ring is an oxidizer agent.

4. The propellant injector defined in claim 1 wherein the means on the outer surface of said second annular member for metering the flow of propellant thereover includes a deep-etched pattern of flow passages terminating at the lower edge of said second annular member.

5. The propellant injector defined in claim 4 wherein the propellant flowing through the passages in said second annular ring is a fuel agent.

* * * * *